United States Patent
Jasinkiewicz

(10) Patent No.: US 8,316,634 B2
(45) Date of Patent: Nov. 27, 2012

(54) AMMONIA LOAD CONTROL FOR SCR CATALYST PRIOR TO DPF REGENERATION

(75) Inventor: Paul Jasinkiewicz, Northville, MI (US)

(73) Assignee: GM Global Technology Operations LLC

( * ) Notice: Subject to any disclaimer, the term of this patent is extended or adjusted under 35 U.S.C. 154(b) by 918 days.

(21) Appl. No.: 12/409,813

(22) Filed: Mar. 24, 2009

(65) Prior Publication Data

US 2010/0242447 A1    Sep. 30, 2010

(51) Int. Cl.
*F01N 3/00* (2006.01)
(52) U.S. Cl. ........... 60/286; 60/274; 60/295; 60/297; 60/301; 60/303; 60/311
(58) Field of Classification Search .......... 60/274, 60/286, 295, 297, 301, 303, 311
See application file for complete search history.

(56) References Cited

U.S. PATENT DOCUMENTS

| | | | | |
|---|---|---|---|---|
| 7,055,313 B2* | 6/2006 | Russell | ........... | 60/286 |
| 7,707,824 B2* | 5/2010 | Solbrig | ........... | 60/286 |
| 7,832,200 B2* | 11/2010 | Kesse et al. | ........... | 60/286 |
| 8,035,532 B2* | 10/2011 | Vosz | ........... | 340/932.2 |
| 8,074,445 B2* | 12/2011 | Ofoli et al. | ........... | 60/286 |

* cited by examiner

*Primary Examiner* — Binh Q Tran
*Assistant Examiner* — Diem Tran

(57) ABSTRACT

A method and control system for a selective catalytic reduction (SCR) catalytic converter and a diesel particulate filter (DPF) includes a DPF control module that determines a particulate matter (PM) load progress of the DPF and generates a DPF regeneration request based on the PM load progress. The control system also includes an SCR control module that selectively adjusts an ammonia load of the SCR catalytic converter prior to regeneration of the DPF based on a storage capacity of the SCR catalytic converter and the PM load progress.

8 Claims, 6 Drawing Sheets

AMMONIA LOAD CONTROL FOR SCR CATALYST PRIOR TO DPF REGENERATION

FIELD

The present disclosure relates to vehicle exhaust systems and, more particularly, to controlling ammonia prior to regenerating an exhaust treatment system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Diesel engine operation involves combustion that generates exhaust gas. During combustion, an air/fuel mixture is delivered through an intake valve to cylinders and is combusted therein. After combustion, the piston forces the exhaust gas in the cylinders into an exhaust system. The exhaust gas may contain emissions such as oxides of nitrogen ($NO_x$) and carbon monoxide (CO).

More and more exhaust hardware technology is being added to meet emissions on diesel applications. After treatment of exhaust gases includes the installation of multiple bricks, mixers and injectors for the exhaust stream. A diesel particulate filter is regenerated periodically to reduce the amount of soot therein. During the process, ammonia is deposited on the selective catalyst-reducing catalysts. During regeneration, if ammonia loading on the selective catalyst-reducing catalyst is too high, the regeneration process will release ammonia into the exhaust stream. To prevent this occurrence, a delay is typically initiated so that when a regeneration of the diesel particulate filter is triggered, an amount of time is waited and dosing fluid injection is terminated. Typically, the process may take 30-60 minutes. Soot-loading rates may cause the diesel particulate filter to become overloaded or the filter being plugged.

SUMMARY

Accordingly, the present disclosure provides for a system and method for reducing the amount of time between a regeneration trigger and starting the actual regeneration process.

In one aspect of the disclosure, a control module for a selective catalytic reduction (SCR) catalytic converter includes a storage adjustment module that determines a storage scalar based on a particulate matter (PM) load progress of a diesel particulate filter (DPF). The control module also includes a dose module that determines an ammonia dose based on a storage capacity of the SCR catalyst and the storage scalar.

In a-another aspect of the disclosure, a control system for a selective catalytic reduction (SCR) catalytic converter and a diesel particulate filter (DPF) includes a DPF control module that determines a particulate matter (PM) load progress of the DPF and generates a DPF regeneration request based on the PM load progress. The control system also includes an SCR control module that selectively adjusts an ammonia load of the SCR catalytic converter prior to regeneration of the DPF based on a storage capacity of the SCR catalytic converter and the PM load progress.

In yet another aspect of the disclosure, a method includes generating a particulate matter (PM) load progress signal corresponding to a load progress the DPF, generating a DPF regeneration request based on the PM load progress and selectively adjusting an ammonia load of the SCR catalytic converter prior to generating the DPF regeneration request based on a storage capacity of the SCR catalytic converter and the PM load progress.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
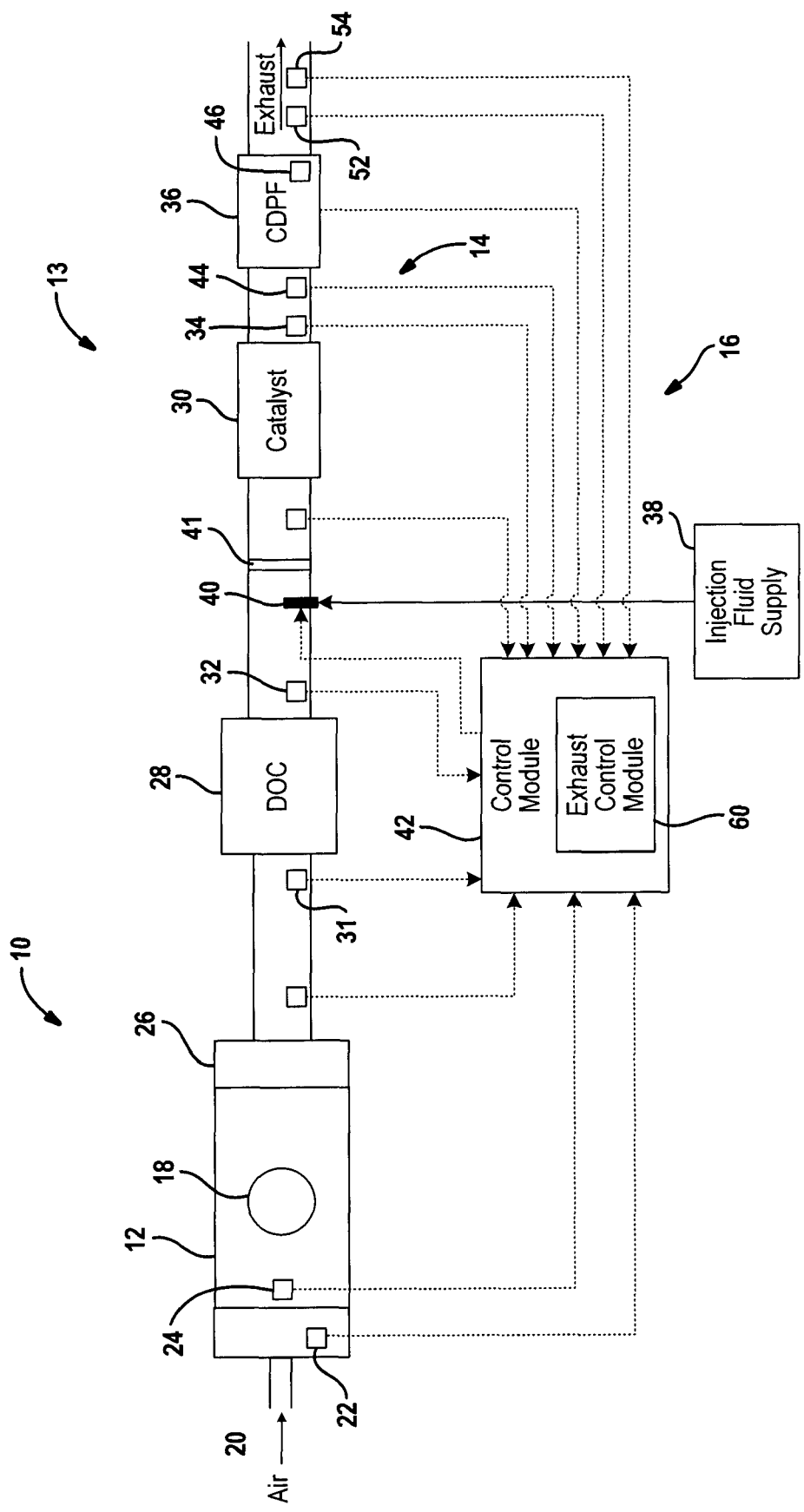
FIG. 1 is a functional block diagram of an engine system including an exhaust treatment system with temperature sensors integrated within a catalyst according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the following disclosure is set forth for diesel engines, other types of engines such as gasoline engines, including direct injection engines, may benefit from the teachings herein.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before releasing the exhaust gas to the atmosphere. The exhaust system 14 includes an exhaust manifold 26 and a diesel oxidation catalyst (DOC) 28. The exhaust manifold 26 directs exhaust exiting the cylinder towards the DOC 28. The exhaust is treated within the DOC 28 to reduce the emissions. The exhaust system 14 further includes a catalyst 30, preferably a selective catalyst reducing (SCR) catalyst, a temperature sensor 31, an inlet temperature sensor 32, an outlet temperature sensor 34 and catalyzed diesel particulate filter (CDPF) 36. The DOC 28 reacts with the exhaust gas prior to treating the exhaust to reduce emission levels of the exhaust. The catalyst 30 reacts subsequent to treating the exhaust to further reduce emissions.

The temperature sensor 31 may be positioned between the engine and the DOC 18. The inlet temperature sensor 32 is located prior to the catalyst 30 to monitor the temperature change at the inlet of the catalyst 30, as discussed further below. The outlet temperature sensor 34 is located after the catalyst to monitor the temperature change at the outlet of the catalyst 30, as discussed further below. Although the exhaust treatment system 13 is illustrated as including the inlet and outlet temperature sensors 32, 34 as being outside the catalyst 30, the inlet and outlet temperature sensors 32, 34 can be located internally with the catalyst to monitor the temperature change of the exhaust at the inlet and outlet of the catalyst. The CDPF 36 further reduces emissions by trapping diesel particulates (i.e., soot) within the exhaust.

The dosing system 16 includes an injection fluid supply 38 that may be used for injecting urea from a tank and a dosing injector 40. The dosing system 16 injects injection fluid such as urea into the exhaust. The urea mixes with the exhaust and further reduces the emissions when the exhaust/urea mixture is exposed to the catalyst 30. A mixer 41 is used to mix the injection fluid such as urea with the exhaust gasses prior to the exhaust gases entering the catalyst.

A control module 42 regulates and controls the operation of the engine system 10 and monitors operation of the dosing system 16.

An exhaust gas flow rate sensor 44 may generate a signal corresponding to the flow of exhaust in the exhaust system. Although the sensor is illustrated between the catalyst 30 and the CDPF 36 various locations within the exhaust system may be used for measurement including after the exhaust manifold and before the catalyst 30.

A temperature sensor 46 generates a particulate filter temperature sensor signal that corresponds to a measured particulate filter temperature. The temperature sensor 46 may be disposed on or within the diesel particulate filter 36. The temperature sensor 46 may also be located just after or just before the diesel particulate filter relative to the exhaust stream. The temperature sensor 46 communicates a measured particulate filter temperature signal to the control module 42.

Other sensors in the exhaust system may include a NOx sensor 50 which generates a signal corresponding to the amount of oxides of nitrogen in the exhaust system. This may be referred to NOx-In since this sensor is upstream of the catalyst. A NOx-Out sensor 52 may be positioned downstream such as after the diesel particulate filter for generating a signal corresponding to the oxides of nitrogen leaving the diesel particulate filter. In addition, an ammonia ($NH_3$) sensor 54 generates a signal corresponding to the amount of ammonia within the exhaust stream.

The control module 42 may include an exhaust control module 60 that is used to control the exhaust conditions and regeneration of the diesel particulate filter. Further details of the control module 42 and the exhaust control module 60 is provided below.

Figure 2:
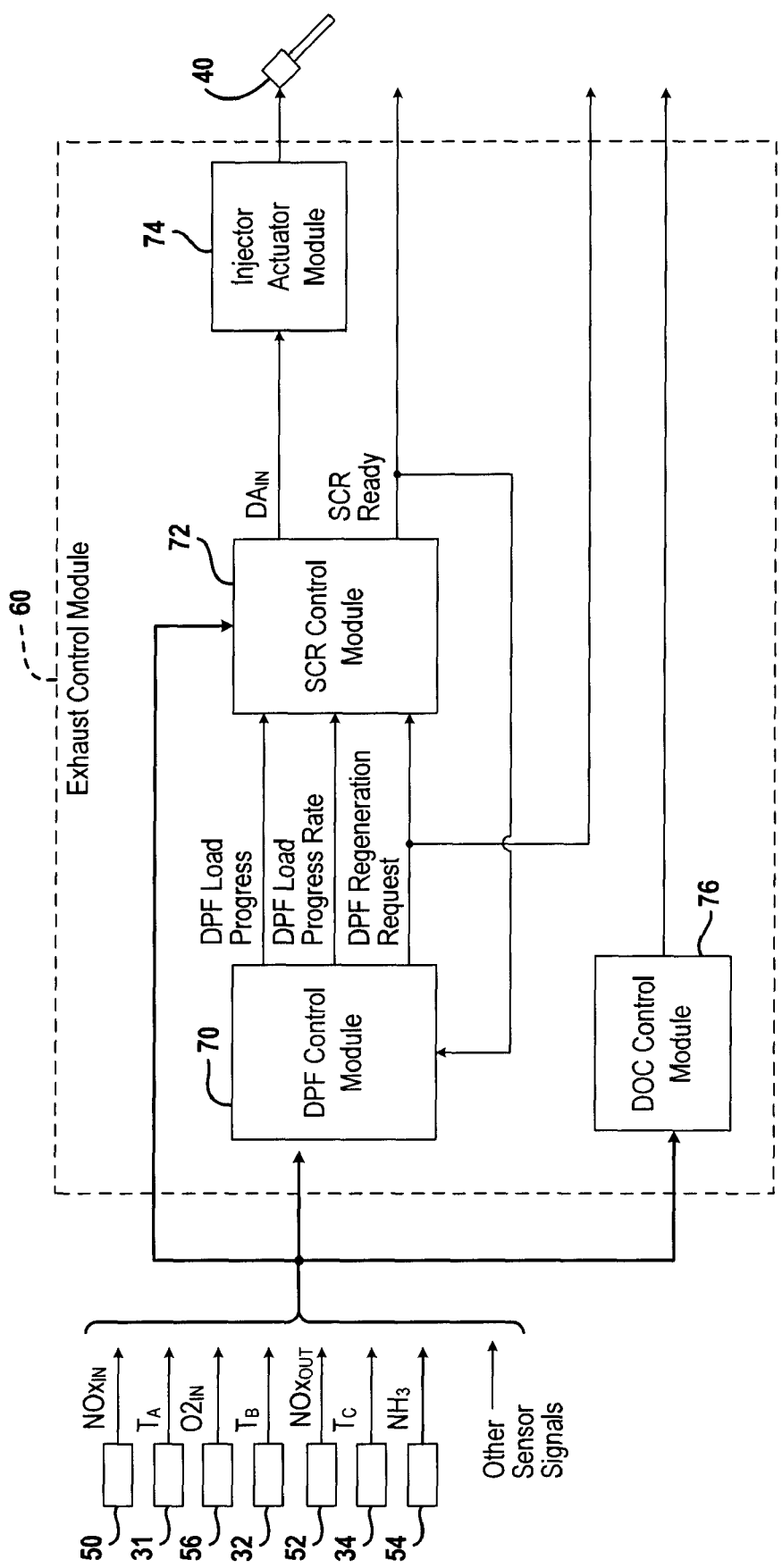
FIG. 2 is a functional block diagram of the controller of FIG. 1.

Referring now to FIG. 2, the exhaust control module 60 of FIG. 1 is illustrated in further detail. The exhaust control module 60 receives inputs from the various sensors including the oxides of nitrogen sensors 50, 52, the temperature sensors 31, 32 and 34, the oxygen sensor 56 and the ammonia sensor 54.

The exhaust control module 60 may include a diesel particulate control module 70, an SCR control module 72, an injector actuator module 74. A diesel oxygen catalyst control module 76 may also be included within the exhaust control module 60. The diesel particulate filter control module 70 may generate signals including a diesel particulate filter load progress signal, a diesel particulate filter load progress rate signal and a diesel particulate filter regeneration request signal. The diesel particulate filter load progress rate signal may be obtained by taking the derivative or slope of the diesel particulate filter load progress signal.

The diesel particulate filter load progress signal, the diesel particulate filter load progress rate signal and the diesel particulate filter regeneration request signal may all be communicated to the SCR control module 72. The SCR control module 72 may generate an SCR ready signal and a dosing amount input signal ($DA_{in}$). The dosing amount input signal may be communicated to the injector actuator module 74. The injector actuator module 74 controls the dosing fluid injector 40. Feedback may also be provided from the SCR control module 72 to the DPF control module 70 in the form of the SCR-ready signal. As mentioned above, as the diesel particulate filter increases toward regeneration, the amount of dosing fluid provided through the injector actuator module 74 is reduced to reduce the amount of ammonia build-up within the SCR.

Figure 3:
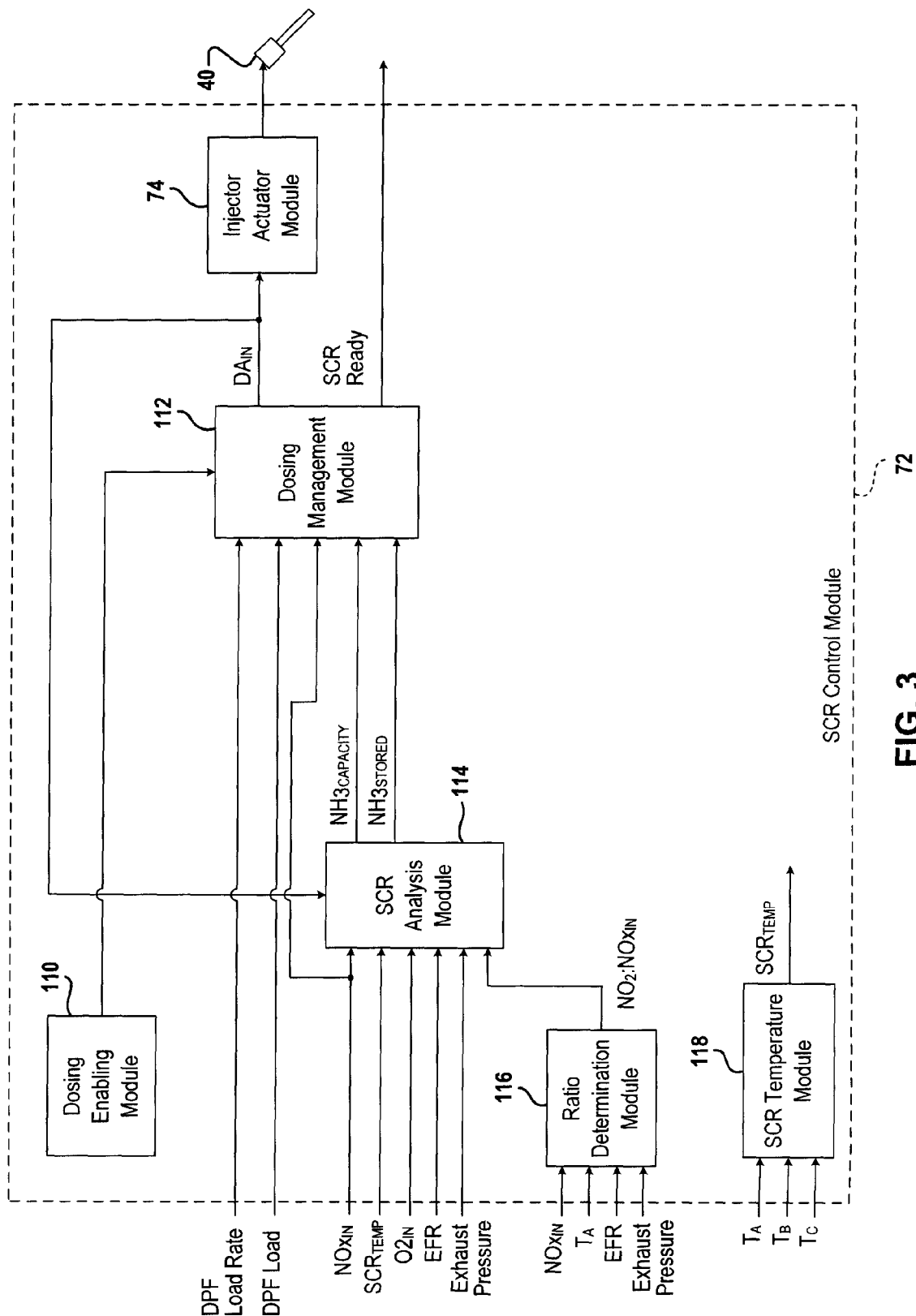
FIG. 3 is a functional block diagram of the SCR control module of FIG. 2.

Referring now to FIG. 3, the SCR control module 72 is illustrated in further detail. The SCR control module 72 may include a dosing-enabling module 110 that enables the dosing system to be enabled upon pre-determined conditions. The dosing-enabling module 110 generates an enable signal that communicates the enable signal to a dosing management module 112. The dosing management module may also receive a diesel particulate filter load rate signal and a load signal. The output of the dosing management module may be the dosing amount input signal and the SCR-ready signal described above.

An SCR analysis module 114 receives inputs from various sensors including the nitric oxide input sensor, the SCR temperature sensor, the oxygen input sensor, the exhaust flow rate sensor, the exhaust pressure sensor, and from a ratio determination module 116. The ratio determination module 116 may generate a ratio of the nitrogen or nitrogen dioxide to the nitrogen oxide input ratio. The ratio determination module 116 may receive signals from the nitric oxide sensor, a temperature signal from an upstream temperature sensor, an exhaust flow rate sensor and an exhaust pressure sensor. Based upon the various inputs, the amount of ammonia stored and the capacity of ammonia for the SCR is provided to the dosing management module 112.

An SCR temperature module 118 may generate an SCR temperature signal based upon the inputs from various temperature sensors such as an upstream sensor 31, a midstream temperature sensor 32 and a downstream sensor 34. Of course, various numbers of temperature sensors as well as various numbers of positions of temperature sensors may be used in the SCR temperature module 118.

The dosing management module 112 may use the ammonia capacity, the ammonia stored as well as the conditions of the diesel particulate filter to determine when to cease providing dosing fluid to the exhaust stream to reduce the amount of ammonia in the system prior to diesel particulate filter regeneration.

Figure 4:
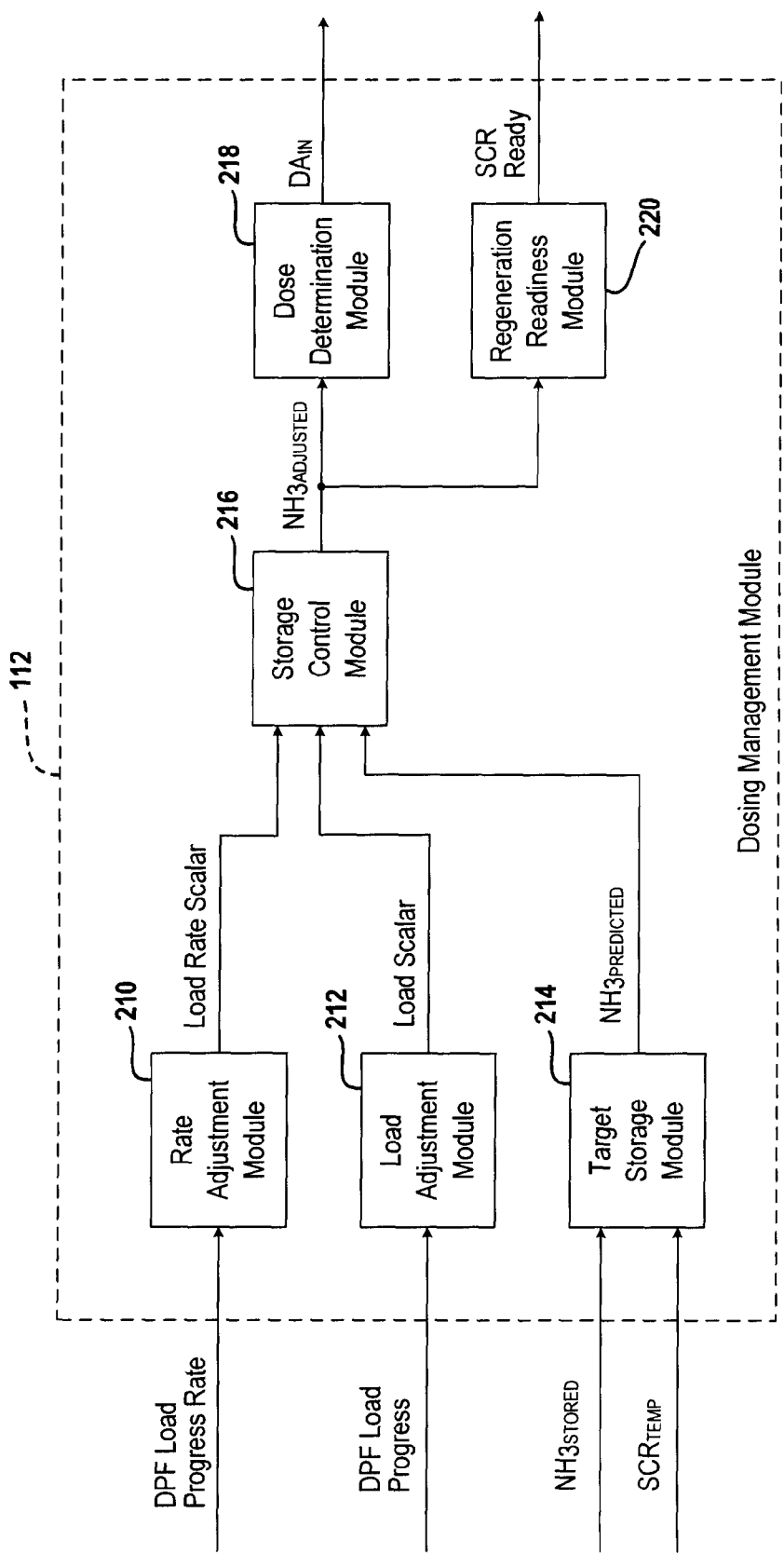
FIG. 4 is a functional block diagram of the dosing management module of FIG. 3.

Referring now to FIG. 4, the dosing management module 112 is set forth in further detail. The dosing management module 112 may include a rate adjustment module 210 that generates a load-rate scalar corresponding to the load progress rate of the diesel particulate filter. A load adjustment module 212 generates a load progress signal corresponding to the progress of the diesel particulate filter. A load scalar may be generated from the load adjustment module 212. A target storage module 214 generates a predicted ammonia signal based upon the ammonia stored and the SCR temperature. The ammonia-predicted signal, the load-scalar signal and the load-rate scalar signal are communicated to the storage control module 216. The storage control module 216 generates an adjusted ammonia signal and communicates the adjusted ammonia signal to a dose determination module 218 and to a regeneration readiness module 220. The regeneration readiness module regenerates the SCR ready signal and the dose determination module 218 generates the dose amount input signal.

Figure 5:
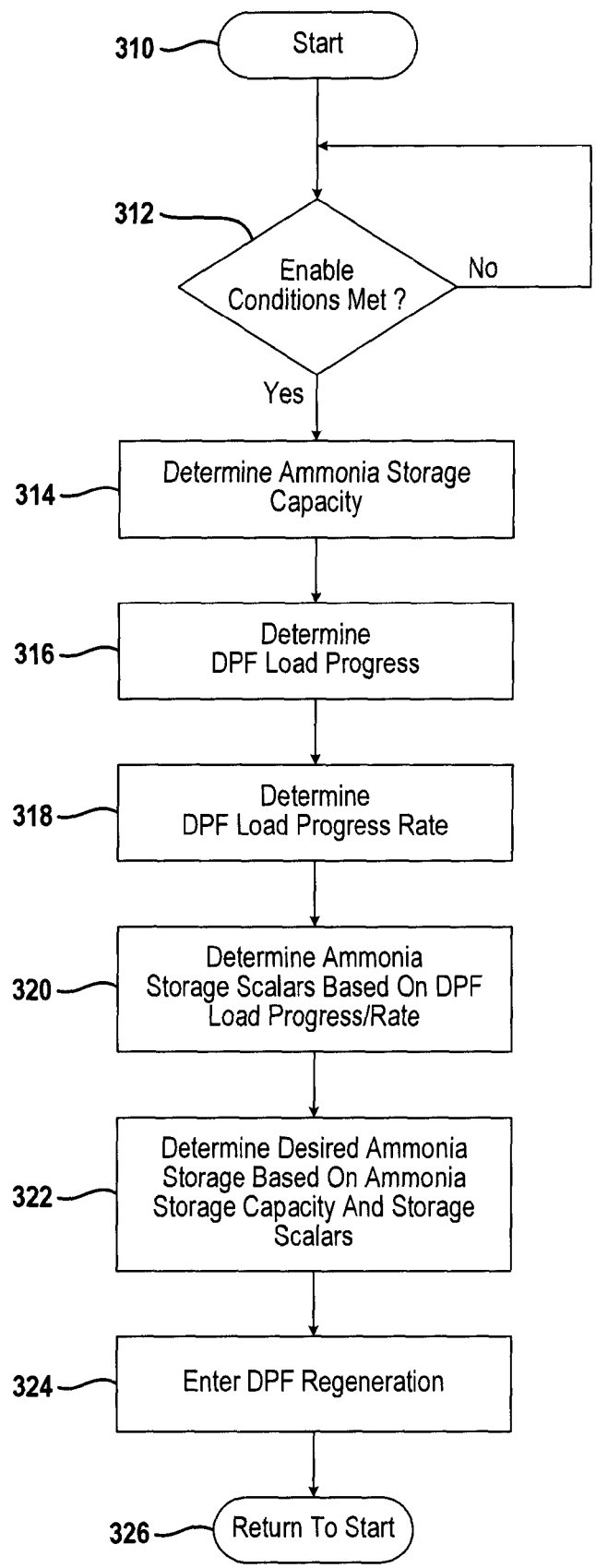
FIG. 5 is a flowchart of a method for controlling the dosing system.

Referring now to FIG. 5, a method for operating the system is set forth. In step 310, the system starts. In step 312, it is determined whether or not enable conditions are met. Various enable conditions such as the engine running for a predetermined amount of time so that the components are up to a predetermined temperature or the like may be set forth. In step 314, the ammonia storage capacity of the SCR is determined. In step 316, the diesel particulate filter load progress may be determined. In step 318, the load progress rate of the diesel particulate filter may be determined. The load progress rate may be determined from the load progress signal by taking the derivative or slope thereof. In step 320, the ammonia storage scalars are determined based upon the diesel particulate filter load progress, load rate or load progress and load progress rate. As the DPF reaches a threshold the desired ammonia storage is reduced. This may be referred to as a target load.

In step 322, the desired ammonia storage based upon the ammonia storage capacity and storage scalars is determined. After the amount of ammonia storage based upon the storage capacity, the diesel particulate filter enters regeneration in step 324. Enough time is preferably allowed so that the amount of storage decreases to a desired amount prior to the regeneration of the diesel particulate filter. After step 324, step 326 returns the system back to start.

Figure 6:
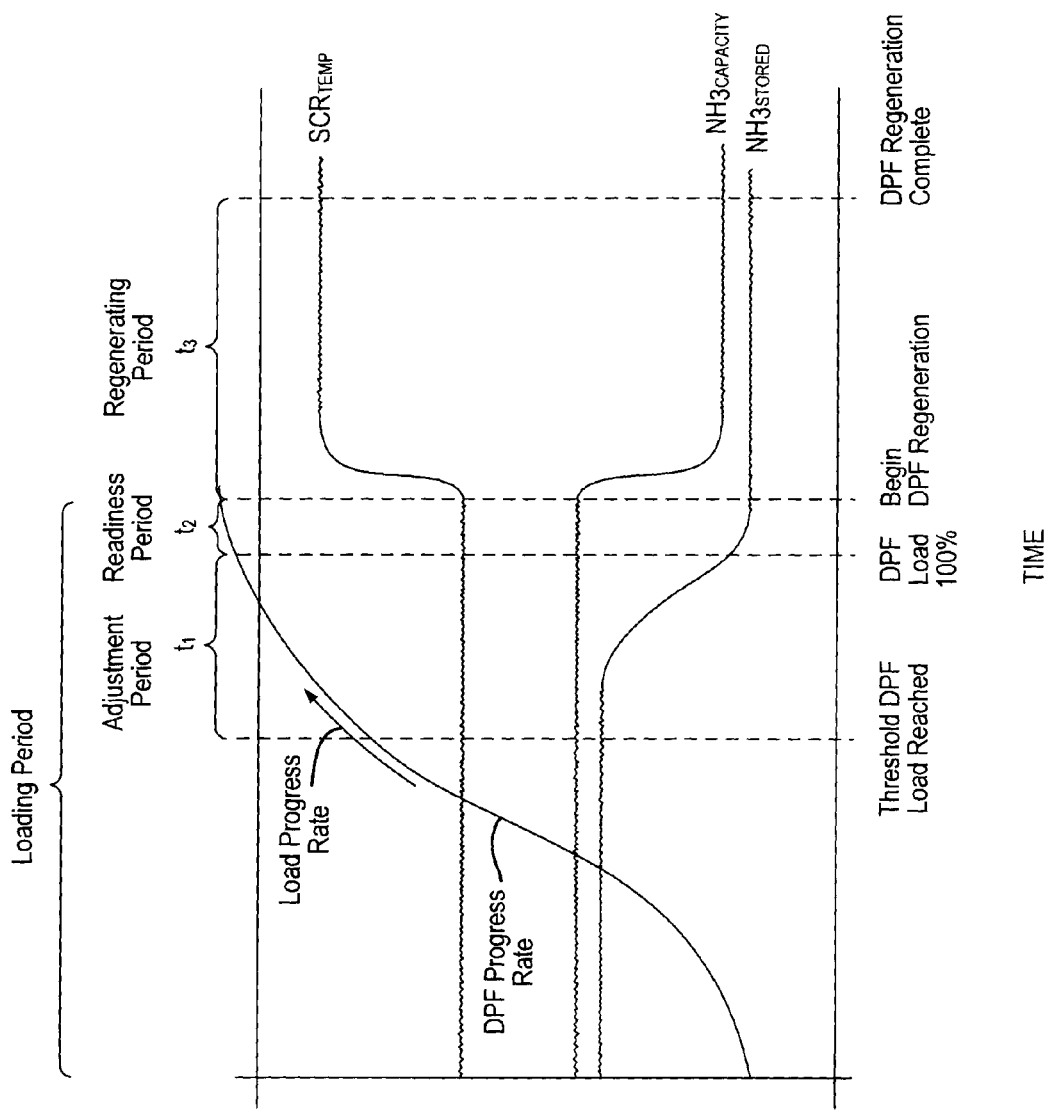
FIG. 6 is a plot of a diesel particulate filter load progress signal, an SCR temperature signal, an ammonia capacity signal and an ammonia stored signal.

Referring now to FIG. 6, a plot of various signals including the load progress signal, the SCR temperature signal, the ammonia capacities signal and the stored ammonia signal are provided at various times. The diesel particulate filter load progress rate is indicated by the arrow from the digital or diesel particulate filter load progress signal. At the beginning of time period t1, the diesel particulate filter load threshold is reached. The threshold indicates that the diesel particulate filter load is increasing and that regeneration is eminent. At the end of time period t1, the diesel particulate filter load is at 100 percent. At the beginning of t1, the amount of ammonia injected into the SCR is reduced. As can be seen, during time period t1 the amount of stored ammonia is reduced from a first level to a second level. During time period t2 a readiness period is entered in which the system is ready to enter a diesel particulate filter regeneration. During time period t3 a regeneration of the diesel particulate filter is performed. The ammonia capacity is reduced during the time period. However, the amount of ammonia stored remains constant. This is indicative that no ammonia is lost during the regeneration process. This is a desirable feature of the invention since releasing ammonia may release unwanted oxides of nitrogen into the exhaust stream.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for a selective catalytic reduction (SCR) catalyst comprising:
    a storage adjustment module that determines a storage scalar based on a particulate matter (PM) load progress of a PM filter;
    a dose module that determines an ammonia dose based on a storage capacity of the SCR catalyst and the storage scalar;
    a PM filter regeneration module initiating regeneration after the ammonia dose is reduced; and
    an SCR control module that selectively adjusts an ammonia load of the SCR catalyst prior to regeneration of the PM filter based on a storage capacity of the SCR catalyst and the PM load progress,
    wherein the SCR control module selectively adjusts the ammonia load of the SCR catalyst based on a comparison of the PM load progress and a progress threshold.

2. The control system of claim 1 wherein the SCR control module adjusts the ammonia load towards a target load when the PM load progress is greater than or equal to the progress threshold, wherein the target load corresponds to an estimated storage capacity of the SCR catalyst during regeneration of the PM filter.

3. The control system of claim 2 wherein the target load corresponds to an ammonia retention level during regeneration.

4. A control system for a selective catalytic reduction (SCR) catalyst and a PM filter comprising:
    a control module that determines a particulate matter (PM) load progress of the PM filter and generates a regeneration request based on the PM load progress; and
    an SCR control module that selectively adjusts an ammonia load of the SCR catalyst prior to regeneration of the PM filter based on a storage capacity of the SCR catalyst and the PM load progress, wherein the SCR control module selectively adjusts the ammonia load of the SCR catalyst based on a comparison of the PM load progress and a progress threshold.

5. The control system of claim 4 wherein the particulate matter (FM) load progress comprises a particulate matter (PM) load progress rate and the control module generates the regeneration request based on the PM load progress rate.

6. The control system of claim 4 wherein the particulate matter (PM) load progress comprises a particulate matter (PM) load progress rate and the control module generates the regeneration request based on the PM load progress rate and the PM load progress.

7. The control system of claim 4 wherein the SCR control module adjusts the ammonia load towards a target load when the PM load progress is greater than or equal to the progress threshold, wherein the target load corresponds to an estimated storage capacity of the SCR catalyst during regeneration of the PM filter.

8. The control system of claim 7 wherein the target load corresponds to an ammonia retention level during regeneration.

* * * * *